United States Patent
Schumann, Jr.

(10) Patent No.: US 8,620,693 B1
(45) Date of Patent: Dec. 31, 2013

(54) SYSTEM AND METHOD FOR PROCESSING AND ADMINISTRATING DEDUCTIBLE CALCULATIONS

(75) Inventor: Douglas D. Schumann, Jr., Wethersfield, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 0 days.

(21) Appl. No.: 13/551,162

(22) Filed: Jul. 17, 2012

(51) Int. Cl.
*G06Q 40/00* (2012.01)

(52) U.S. Cl.
USPC .............................................................. 705/4

(58) Field of Classification Search
CPC ..................................................... G06Q 40/08
USPC .............................................................. 705/4
See application file for complete search history.

(56) References Cited

U.S. PATENT DOCUMENTS

| | | | |
|---|---|---|---|
| 7,774,217 B1 | 8/2010 | Yager et al. | |
| 8,046,244 B1 | 10/2011 | Yager et al. | |
| 8,046,246 B1 | 10/2011 | Yager et al. | |
| 8,090,601 B2 | 1/2012 | Schuver et al. | |
| 2007/0136109 A1 | 6/2007 | Yager et al. | |
| 2009/0248454 A1* | 10/2009 | Amigo et al. | 705/4 |
| 2011/0093299 A1* | 4/2011 | Stepeck et al. | 705/4 |
| 2011/0137684 A1* | 6/2011 | Peak et al. | 705/4 |
| 2011/0264472 A1* | 10/2011 | Mostelac | 705/4 |

FOREIGN PATENT DOCUMENTS

WO   WO0133465 A2 *   5/2001   ............. G06F 17/60

OTHER PUBLICATIONS

Anonymous, "What's a 'zero deductible' insurance policy?", CNNMoney, Sep. 26, 2011.*

* cited by examiner

*Primary Examiner* — Eric T Wong
(74) *Attorney, Agent, or Firm* — Howard IP Law Group, PC (57) ABSTRACT

An insurance policy management system for administering and managing insurance policies having deductible coverage through a primary and a secondary insurer. The secondary insurer is provided a portion of a premium payment via the primary insurer to provide deductible coverage to a policyholder. The policyholder will not have to pay a lump sum deductible in the event of a loss when selecting the no deductible option and may have the option of bidding out the deductible coverage in a multi-insurer platform.

19 Claims, 9 Drawing Sheets

SYSTEM AND METHOD FOR PROCESSING AND ADMINISTRATING DEDUCTIBLE CALCULATIONS

BACKGROUND

For insurance policies, a deductible is typically the amount that must be paid out of pocket before the insurer will pay out on an associated claim. The deductible is normally quoted as a fixed dollar amount and is a standard part of insurance policies. In the event of a loss, in some policies, the deductible must be paid by the insured, before the benefits of the policy are paid. In some policies, the amount due to the insured for a covered loss is reduced by the amount of the deductible, but there is no requirement that the insured pay the amount out of pocket before payment by the insurer. Typically, the higher the deductible, the lower the premium, and vice versa. For example, a policy with a yearly premium of $1000 may have a $500 deductible, a policy with a yearly premium of $1500 may have a $250 deductible, and so on. Depending on the policy, the deductible may apply per incident, per year or for the life of the policy. In a typical automobile insurance policy, a deductible will apply to claims arising from damage to or loss of the policy holder's vehicle without regard to fault.

Another type of deductible in the marketplace is the so-called disappearing or vanishing type deductible. The so-called disappearing type deductible is a formula deductible that decreases as the amount of loss increases or in the case of automobile policies, where the insured has no losses/accident. The disappearing deductible may eventually disappear completely over a period of years if the policyholder does not have any claims or losses.

A negative consequence of having a deductible is that many policyholders never report many smaller accidents, losses or claims as the bulk of the cost will be borne by the policyholder requiring a lump sum payment from the policyholder on their own behalf. For example, if a policyholder has a $600 loss and a $500 deductible, the policyholder will not be likely to report the claim as the policyholder would have to pay for most of the loss anyway and then also incur a potential negative rating from the insurer due to the loss. By way of further example, even if a policyholder were to have a $1000 loss with a $500 deductible policy, half of the loss would still have to be borne by the policyholder and thus the policyholder may still be incentivized not to report the claim.

Accordingly, it would be desirable to have a system that could provide policyholders with improved deductible choices including a policy with no deductible at all.

SUMMARY

In one embodiment, the present invention is a system for administering policies without requiring lump sum deductible payments by a consumer, the system comprising: one or more processors; a memory device coupled to the one or more processors; and one or more programs, wherein the one or more programs are stored in the memory and configured to be executed by the one or more processors, the one or more programs including instructions for: displaying an insurance policy application graphical user interface, providing a deductible option selection screen on the graphical user interface; receiving a deductible option selection from the graphical user interface; storing the deductible option selection in a storage device; and responsive to receiving an insured deductible option selection from the graphical user interface, communicating via a communications network, the deductible option selection to a primary and a secondary insurer, the secondary insurer providing deductible insurance coverage without involving the consumer.

The present invention in other embodiments is a computer system for providing insured deductibles options comprising: a processor; and a memory storage device in communication with the processor; the processor configured to: receive via a computer communications network applicant data related to a no deductible option selection; store the no deductible option selection in the memory storage device; determine, based on the no deductible option selection, a premium associated with the no deductible option selection; and transmit information related to the no deductible option selection to at least two insurers, wherein the at least two insurers share the determined premium.

In other embodiments, the present invention is a computer-implemented method for administering insurance policies in a multi-insurer platform, the policies having separable deductible coverages, comprising: receiving, via a communications interface, data for an insurance policy related to at least one party; determining, via a computer processor, insurance premium information for the at least one party; selecting, via the computer processor, two or more insurers for sharing of the insurance policy; storing, via a data storage device information related to the two or more insurers; and transmitting data to the two or more selected insurers, wherein one of the selected insurers is allocated a deductible coverage.

BRIEF DESCRIPTION OF THE DRAWINGS

A more detailed understanding may be had from the following description, given by way of example in conjunction with the accompanying drawings wherein.

DETAILED DESCRIPTION

Disclosed herein are processor-executable methods, computing systems, and related technologies for the administration, management and communication of insurance deductible options, especially certain no deductible options. Utilizing the present invention, an applicant can select a so-called "no-deductible" option for an insurance policy issued by a primary insurer and thus not have to pay a deductible, or not have the amount paid by the primary insurer on a claim reduced by the value of the deductible, for any of their claims or losses against the insurance policy. The no-deductible policy has a shadow or background deductible that is co-insured by an entity other than the primary insurer and a portion of the premium paid by the policyholder may be allocated between a primary and the other entity, which is referred to as an auxiliary or secondary insurer. In the event of a claim or loss covered under the policy, the primary insurer pays the claim without awaiting payment by the insured of the deductible amount, and/or without deduction of the amount of the deductible from the payment. The auxiliary or secondary insurer would then be responsible for paying the primary insurer the requisite deductible. While the entity that is obliged to pay the amount of the deductible to the primary insurer is referred to herein as a secondary or auxiliary insurer, such entities need not be licensed to issue insurance policies in a particular jurisdiction.

Figure 1:
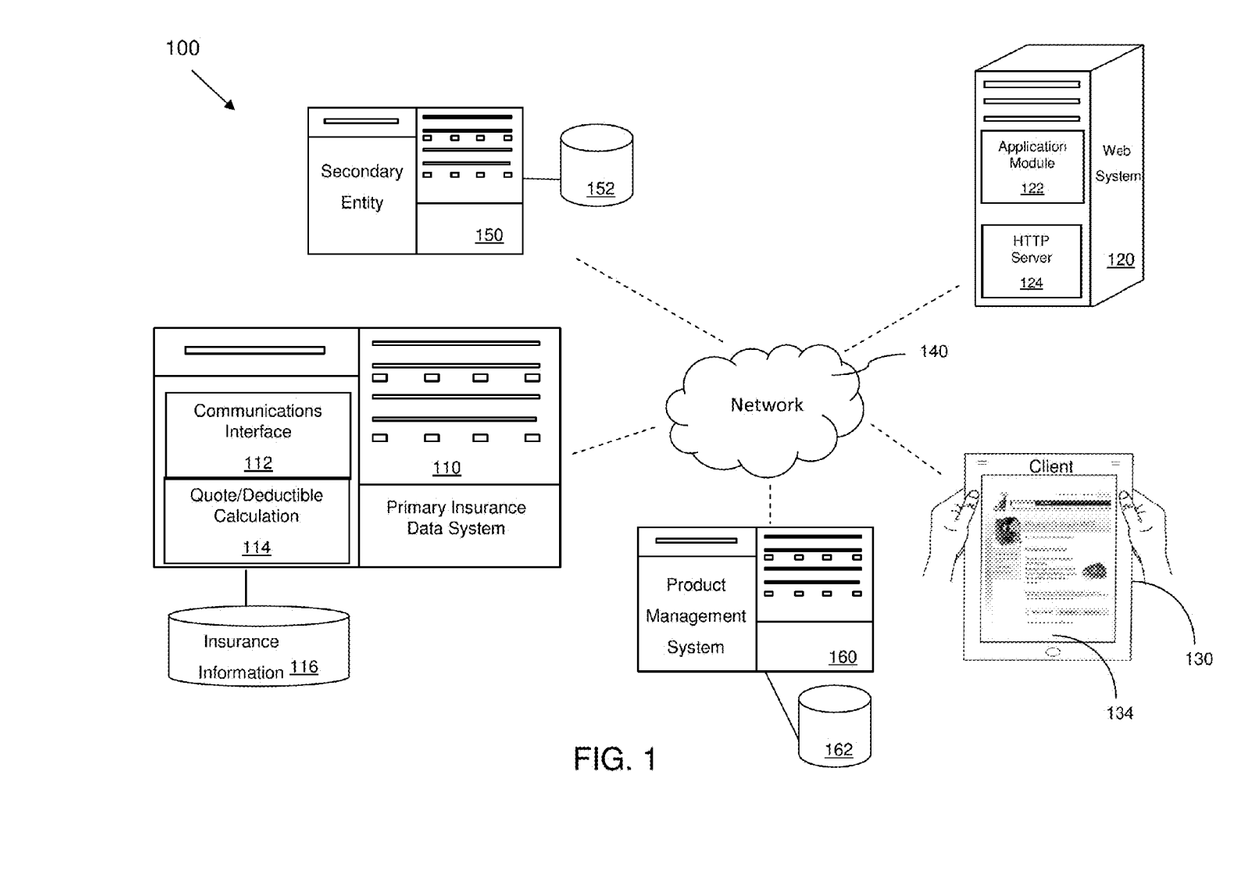
FIG. 1 shows an exemplary computer architecture that may be used for insurance quote administration and management.

FIG. 1 shows an example architecture 100 that may be used for the administration and management of insurance deductibles including a shadow deductible policy of the present invention. The example architecture 100 may include a primary insurance data system 110, a web site system 120, a client device 130, a network 140, a secondary or auxiliary data management system 150 and a product management system 160. Secondary data management system 150 may also include a database 152. In the example architecture 100 of FIG. 1, the primary insurance data system 110 and the product management system 160 may be under the control of an insurance/financial services company and their associated agents/brokers. In other embodiments, primary insurance data system 110 may be integrated with product management system 160 with both primary insurance data system 110 and product management system 160 being under the control of an insurance entity.

Referring still to FIG. 1, the primary insurance data system 110 may include a communications interface module 112, an insurance quote/deductible calculation module 114, and an insurance information database 116. The insurance quote/deductible calculation module 114 may include one or more software modules or objects and one or more specific-purpose processor elements to perform the calculations and processing required by the present invention such as for calculating the premium for an insurance policy including a shadow deductible feature. In some embodiments, the insurance quote/deductible calculation module 114 may also include one or more business rules and one or more predictive models. The business rules may provide guidelines on how to rate and quote requested coverage for individuals and entities based on certain types of information and how to calculate and apportion deductibles and associated premiums as between primary insurer 110 and secondary entity 150. Rules such as related to pre-qualification for the insured or no deductible option may be implemented, such as requiring the consumer or policyholder to have a specific performance or risk rating before they can qualify for the no deductible option. The pre-qualification may be based on historical past performance of a policyholder, such as past claims history of a policyholder, past driving record of a policy holder, or other data relating to historical past performance of a policy holder. The pre-qualification may be based on other rules such as conditioning the no deductible option to telematics based performance, such as driving data and home or other structure related data obtained via telematics. In embodiments, the availability of the no deductible option may be binary, i.e., either available or not, based on pre-qualification, or may be limited, such as available only up to a percentage of the deductible, based on pre-qualification rules. Other business rules may be implemented in accordance with the present invention.

In operation, the insurance quote/deductible calculation module 114 may receive client data in a home insurance or an automobile insurance context such address, age of home or apartment, characteristics of the home or apartment, zip code, types of possessions, loss history, drivers license number, make and model of vehicle, mileage, approximate annual use of the vehicle, how many household drivers and ages, general driving history, VIN number for vehicle to be insured, a list of the vehicle's safety and anti-theft devices, policy numbers of existing polices (for multi-policy discounts/only applies to current insurer), address of individual, etc. provided through client device 130 of the present invention. Insurance quote/deductible calculation module 114 may also receive or access certain third party data, such as data of municipal and other local government and quasi-governmental agencies, motor vehicle department data, social network information, as well as other third party sources of information.

Insurance quote/deductible calculation module 114 in conjunction with product management system 160 may also output one or more quotations for one or more insurance/financial services products such as home or automobile insurance for review and approval by the user. The recommendations may take into account the user's inputs provided, social network data related to the user and the characteristics of the insurance product. Insurance quote/deductible calculation module 114 may also determine the requisite premium allocations between the primary insurer 110 and the secondary entity 150 so that the policyholder's premium may be proportionally allocated between the primary policy the shadow deductible.

Insurance/quote deductible calculation module 114 may determine premium allocations in any suitable manner. By way of example, insurance/quote deductible calculation module 114 may access one or more databases containing one or more tables having determined dollar figures, or formulas or combinations thereof, for a no deductible portion of a premium based on factors including amount of deductible to be covered by the secondary insurer, type of coverage (e.g., automotive, homeowners, renters or other type of coverage), jurisdiction (e.g., state) of coverage, covered property address, coverage limits, type of covered vehicle for automotive policies, policy term, driving record of the insured, identity of the secondary insurer, and other data. By way of simple example, a table may include a premium amount of $50 for coverage of a deductible of $1000 for automotive policies having a one-year term for vehicles garaged in the State of Connecticut, and the same or different dollar amounts for coverage of other terms, other states, and the like. In another embodiment, insurance/quote deductible calculation module may access formulas for determination of the no deductible portion of premium. By way of simplified example, a formula may provide that coverage of a deductible of $1000 for automotive policies having a one-year term for vehicles garaged in the State of Connecticut may be equal to 10% of the premium for the underlying policy, and for automotive policies having a six month term for vehicles garaged in the State of New York may be equal to 12% of the premium of the underlying policy. In another embodiment, a formula may provide for sharing of a total premium between the primary insurer and the secondary insurer on a proportional basis, such as 90% of the total premium to the primary insurer and 10% of the total premium to the secondary insurer. The insurance/quote deductible calculation module 114 may be configured to select a proportional allocation formula dependent on any one or more of various factors, including those set forth above. Any combination of dollar values and formulas may also be employed in the determination of premium allocations.

The insurance information database 116 may store information such as the user provided input, premium allocation information, social network information, and third party data information related to the user/applicant. Insurance information database 116 may be spread across one or more computer-readable storage media, and may be or include one or more relational databases, hierarchical databases, object-oriented databases, one or more flat files, one or more spreadsheets, and/or one or more structured files. Insurance information database 116 may be managed by one or more database management systems (not depicted), which may be based on a technology such as Microsoft SQL Server, MySQL, Oracle Relational Database Management System (RDBMS), PostgreSQL, a NoSQL database technology, and/or any other appropriate technology.

Communication between the primary insurance data system 110 and the other elements in the example architecture 100 of FIG. 1 may be performed via the communications interface module 112 interacting with network 140. The primary insurance data system 110 may also access third party systems and third party data, not shown, which may include motor vehicle department data, driving history, social network history and activity and other sources of information which may impact the insurance determinations and transactions herein via network 140. For example, primary insurance data system 110 may interface with computer systems associated with one or more third party sites to receive data related to client 130 such as the applicant's housing characteristics, habits, risk profiles, and interests. For example, third party sites may include e-commerce sites, utility provider sites, automobile sites, real estate sites and other variety of sites accessible via the Internet.

Referring still to FIG. 1, the product management system 160 may perform functionality such as storing and processing information related to certain insurance products such as home insurance, automobile insurance and commercial/business insurance. For example, the product management system 160 may include information on certain types of insurance products such as the product characteristics, benefits, features, deductibles, limits, etc. The product management system 160 may store this information in a product management database 162. The product management database 162 may also be spread across one or more computer-readable storage media, and may be or include one or more relational databases, hierarchical databases, object-oriented databases, one or more flat files, one or more spreadsheets, and/or one or more structured files. As will be described in further detail below, the primary insurance data system 110 may use information from the product management database 162 to select and purchase or sell potential products which may be suitable for one or more clients based on their information and needs.

Referring still to FIG. 1, a web site system 120 may provide a web site that may be accessed directly by a consumer operating a user client device 130. User client device 130 can include, but is not limited to cellular telephones, other wireless communication devices, personal digital assistants, pagers, laptop computers, tablet computers, smartphones, or combinations thereof. The user client device may store data including application or app data, and the processor of the user client device or a processor of web site system 120 or another system may be configured to render a graphical user interface as described herein via the mobile device app. In the present invention, user client device 130 may communicate with the web site system 120 that may be operated by or under the control of an insurance entity or other third party entity such as an outsourced type entity or third party administrator type entity. The web site system 120 may generate one or more web pages for access by consumer client device 130, and may receive responsive information from the consumer client device 130 such as user information for obtaining an insurance quotation for a no deductible type product. The responsive information may include information that identifies the consumer, information related to the product(s) that the consumer is viewing, purchasing or requesting, and/or other related types of information. The web site system 120 may then communicate this information to the insurance management system 110 for processing via communications interface 112. The web site system 120 may also communicate one or more web pages to the consumer client device 130 that provide one or more product options that may be suitable for the consumer from product management system 160.

In operation, client device 130 may be used to approve and/or select one or more of the product options in accordance with their needs. Selection via client device 130 may be accomplished via a touch-sensitive touch screen that provides an input interface and an output interface between the client device 130 and the client or user. The client device 130 displays visual output to the user for manipulation by the user. The visual output may include checkboxes, radio buttons, graphics, text, icons, video, and any combination thereof. The visual output may include a deductible option selection screen in a graphical user interface, by way of example. The touch screen may display one or more graphics within user interface displayed on device 130. In this embodiment, as well as others, a user may select one or more of the graphical elements by making contact or touching the graphics, for example, with one or more fingers or stylus implements. The user may thus provide a deductible option selection from a graphical user interface.

The web site system 120 may include an insurance web application module 122 and a HyperText Transfer Protocol (HTTP) server module 124. The web application module 122 may generate the web pages that make up the web site and that are communicated by the HTTP server module 124. The insurance web application module 122 may be implemented in and/or based on a technology such as Active Server Pages (ASP), PHP: Hypertext Preprocessor (PHP), Python/Zope, Ruby, any server-side scripting language, and/or any other appropriate technology.

The HTTP server module 124 may implement the HTTP protocol, and may communicate HyperText Markup Language (HTML) pages and related data from the web site to/from the consumer client device 130 using HTTP. The HTTP server module 124 may be, for example, a Sun-ONE Web Server, an Apache HTTP server, a Microsoft Internet Information Services (IIS) server, and/or may be based on any other appropriate HTTP server technology. The web site system 120 may also include one or more additional components or modules (not depicted), such as one or more switches, load balancers, firewall devices, routers, and devices that handle power backup and data redundancy.

Referring still to FIG. 1, the consumer client device 130 may include a web browser module 134, which may communicate data related to the web site to/from the HTTP server module 124 and the insurance web application module 122 in the web site system 120. The web browser module 134 may include and/or communicate with one or more sub-modules that perform functionality such as rendering HTML (including but not limited to HTML5), rendering raster and/or vector graphics, executing JavaScript, and/or rendering multimedia content. Alternatively or additionally, the web browser module 134 may implement Rich Internet Application (RIA) and/or multimedia technologies such as Adobe Flash, Microsoft Silverlight, and/or other technologies. The web browser module 134 may implement RIA and/or multimedia technologies using one or web browser plug-in modules (such as, for example, an Adobe Flash or Microsoft Silverlight plugin), and/or using one or more sub-modules within the web browser module 134 itself. The web browser module 134 may display data on one or more displays that are included in or connected to the consumer client device 130, such as a liquid crystal display (LCD) display, organic light-emitting diode (OLED) display, touch screen or monitor. The consumer client device 130 may receive input from the user of the consumer client device 130 from input devices (not depicted) that are included in or connected to the consumer client device 130, such a mouse or other pointing device, or a touch screen, and provide data that indicates the input to the web browser module 134.

The example architecture 100 of FIG. 1 may also include one or more wired and/or wireless networks within network 140 via which communications between the elements 110, 120, 130, 150 and 160 in the example architecture 100 may take place. The networks may be private or public networks, and/or may include the Internet. In one example deployment scenario, the primary insurance data system 110, web site system 120, secondary data management system 150 and product management system 160 may communicate via one or more private networks that are under the control of the financial services/insurance company, while the consumer client device 130 may communicate with the web site system 120 via the Internet.

Each or any combination of the modules 112, 114, 122, and 124 shown in FIG. 1 may be implemented as one or more software modules or objects, one or more specific-purpose processor elements, or as combinations thereof. Suitable software modules include, by way of example, an executable program, a function, a method call, a procedure, a routine or sub-routine, one or more processor-executable instructions, an object, or a data structure. In addition or as an alternative to the features of these modules described above with reference to FIG. 1, these modules 112, 114, 122, and 124 may perform functionality described later herein.

Figure 2:
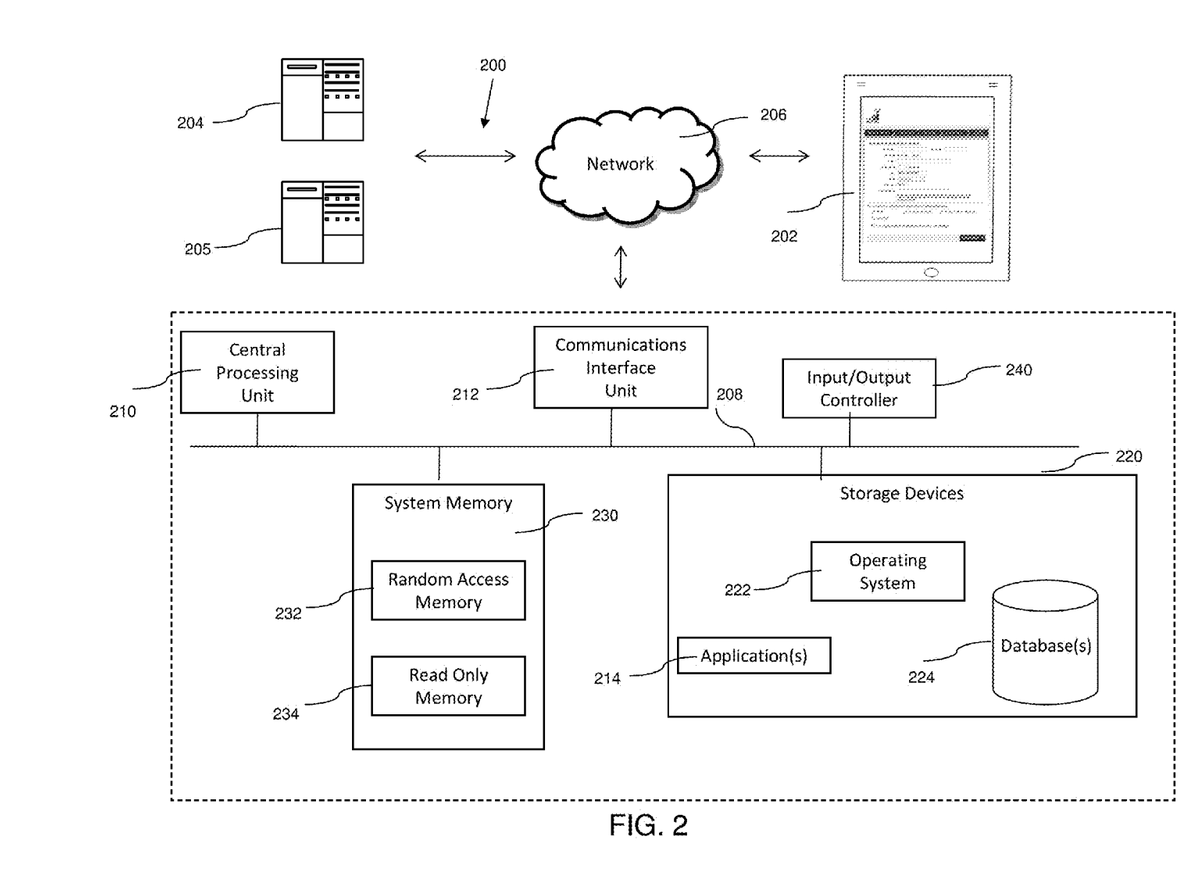
FIG. 2 shows an exemplary system that may be used for the management of insurance quotations.

Referring to FIG. 2, an exemplary computer system 200 for use in an implementation of the invention will now be described. Computer system 200 may be configured to perform insurance deductible processing and management for one or more users, clients or customers 202. System 200 may interface with a primary insurance company system 204 and a secondary insurance company system 205 via a network 206. In the present invention, primary system 204 is responsible for the primary policy functions associated with customer 202 and secondary system 205 is responsible for the deductible portion of the policy. In computer system 200, a central processing unit or processor 210 executes instructions contained in programs such as financial management application program 214, stored in storage devices 220. Processor 210 may provide the central processing unit (CPU) functions of a computing device on one or more integrated circuits. As used herein, the term "processor" broadly refers to and is not limited to a single- or multi-core general purpose processor, a special purpose processor, a conventional processor, a Graphics Processing Unit (GPU), a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine.

Storage devices 220 may include suitable media, such as optical or magnetic disks, fixed disks with magnetic storage (hard drives), tapes accessed by tape drives, and other storage media. Processor 210 communicates, such as through bus 208 and/or other data channels, with communications interface unit 212, storage devices 220, system memory 230, and input/output controller 240. System memory 230 may further include a random access memory 232 and a read only memory 234. Random access memory 232 may store instructions in the form of computer code provided by application 214 to implement the present invention. System 200 further includes an input/output controller 240 that may communicate with processor 210 to receive data from user inputs such as pointing devices, touch screens, and audio inputs, and may provide data to outputs, such as data to video drivers for formatting on displays, and data to audio devices.

Storage devices 220 are configured to exchange data with processor 210, and may store programs containing processor-executable instructions, and values of variables for use by such programs. Processor 210 is configured to access data from storage devices 220, which may include connecting to storage devices 220 and obtain data or read data from the storage devices, or place data into the storage devices. Storage devices 220 may include local and network accessible mass storage devices. Storage devices 220 may include media for storing operating system 222 and mass storage devices such as storage 224 for storing data related to insurance information related to the customers such as driving history, etc. Communications interface unit 212 may communicate via network 206 with other financial services/insurance company computer systems such as insurance company system servers 204 as well as other servers, computer systems of agents, financial advisors, customers, remote sources of data, and with systems for implementing instructions output by processor 210. Insurance services company server 204 may also be configured in a distributed architecture, wherein databases and processors are housed in separate units or locations. Some such servers perform primary processing functions and contain at a minimum, a RAM, a ROM, and a general controller or processor. In such an embodiment, each of these servers is attached to a communications hub or port that serves as a primary communication link with other servers, client or user computers and other related devices. The communications hub or port may have minimal processing capability itself, serving primarily as a communications router. A variety of communications protocols may be part of the system, including but not limited to: Ethernet, SAP, SASTM, ATP, Bluetooth, GSM and TCP/IP. Network 206 may be or include wired or wireless local area networks and wide area networks, and over communications between networks, including over the Internet. One or more public cloud, private cloud, hybrid cloud and cloud-like networks may also be implemented, for example, to handle and conduct processing of one or more transactions or calculations of the present invention, including computation of a premium for transmission to a user/application. Cloud based computing may be used herein to handle any one or more of the application, storage and connectivity requirements of the present invention. Furthermore, any suitable data and communication protocols may be employed to accomplish the teachings of the present invention.

With reference still to FIG. 2, communications interface 212 is used for receiving user data related to the user's insurance requirement and background. Computer processor 210 executes program instructions, such as provided by application 214 to receive, via the communications interface 212, third party data, social network data and other related information. Database 224 may include transaction data such as historical data from the user or other third parties.

Figure 3:
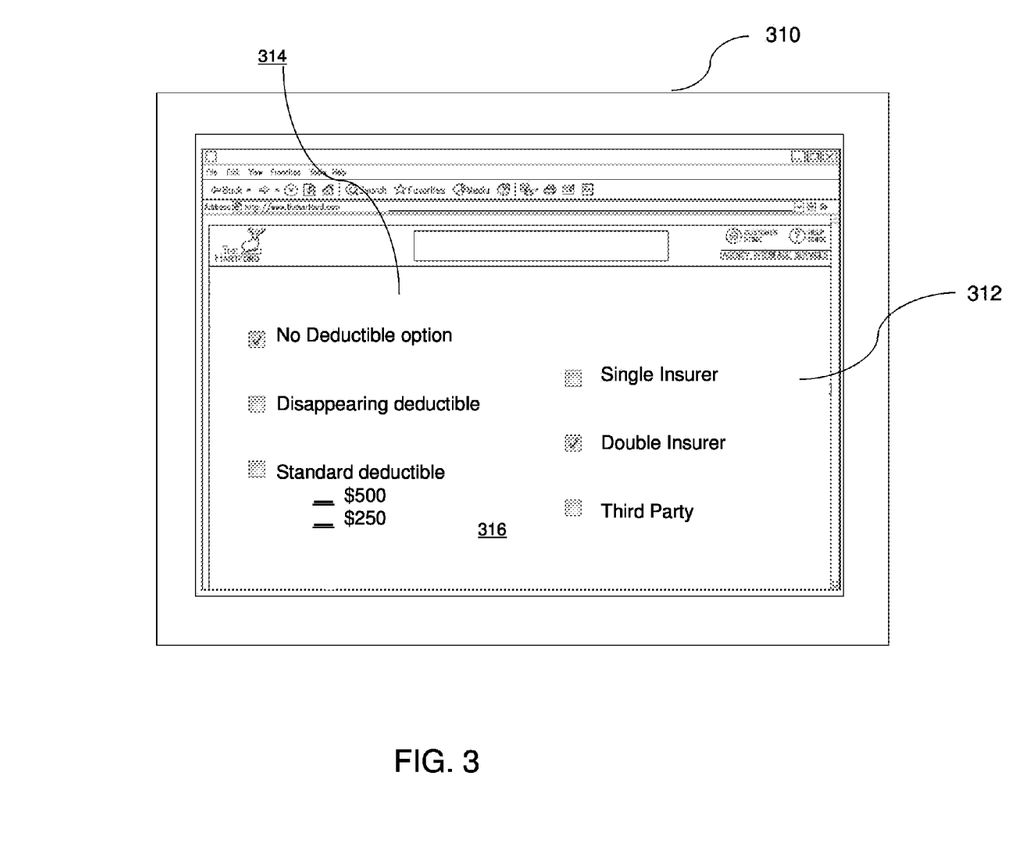
FIG. 3 shows an exemplary system screen of the present invention.

FIG. 3 illustrates an exemplary screen of the present invention as may be displayed among devices shown in FIGS. 1 and 2. In one embodiment, a user operates a device 310, such as a portable computing device for viewing and accessing information and data related to an insurance policy as described herein. Portable computing device may include a touch screen 312 that can be an active sensor employing capacitive, resistive, inductive, or other methods, or it can be a passive surface on which touch sensing is accomplished by optical, acoustic, or other similar methods. Device 310 can also be a liquid crystal display (LCD), organic light emitting diode (OLED) display, electroluminescent display, or any other type of small display suitable for mounting in a portable computer or mobile device. Device 310 may be color or monochrome, and may include a backlight capability to enhance readability in various lighting conditions.

In the present invention, device 310 displays a web document 314 for access by a user. Web document 314 may include an input area 316 for selecting inputs related to the insurance deductible choice such as an insured deductible option, which may include a no deductible option, and other related options. Deductible options may include an insured or no deductible option, a disappearing deductible and a standard deductible. Options may also include single insurer and multiple insurer variations that may be selected by the consumer or current or future policyholder or may be pre-selected by the insurer. In accordance with the present invention selecting the no deductible option will provide the insured with a deductible that is covered by a secondary insurer so that in the event of a claim or loss, the secondary insurer pays the primary insurer the required deductible without requiring a lump sum payment by the policyholder. The deductible coverage is separable deductible coverage, as the deductible coverage is separated from the coverage under the policy furnished by the primary insurer.

Device 310 may also be in communication with a insurance entity operated website 330. Website 330 displays information 334 on one or more insurance/financial services product(s) that have been determined to be suitable for the consumer based on their inputs and selections. It is contemplated that the functionality of website 330 may be integrated within web document 314 such as in a frame, window or other manner so that access to information 334 may be accomplished in a single screen 314 such as shown with respect to icons 336 that provide for viewing and selection of one or more insurance related products.

Figure 4:
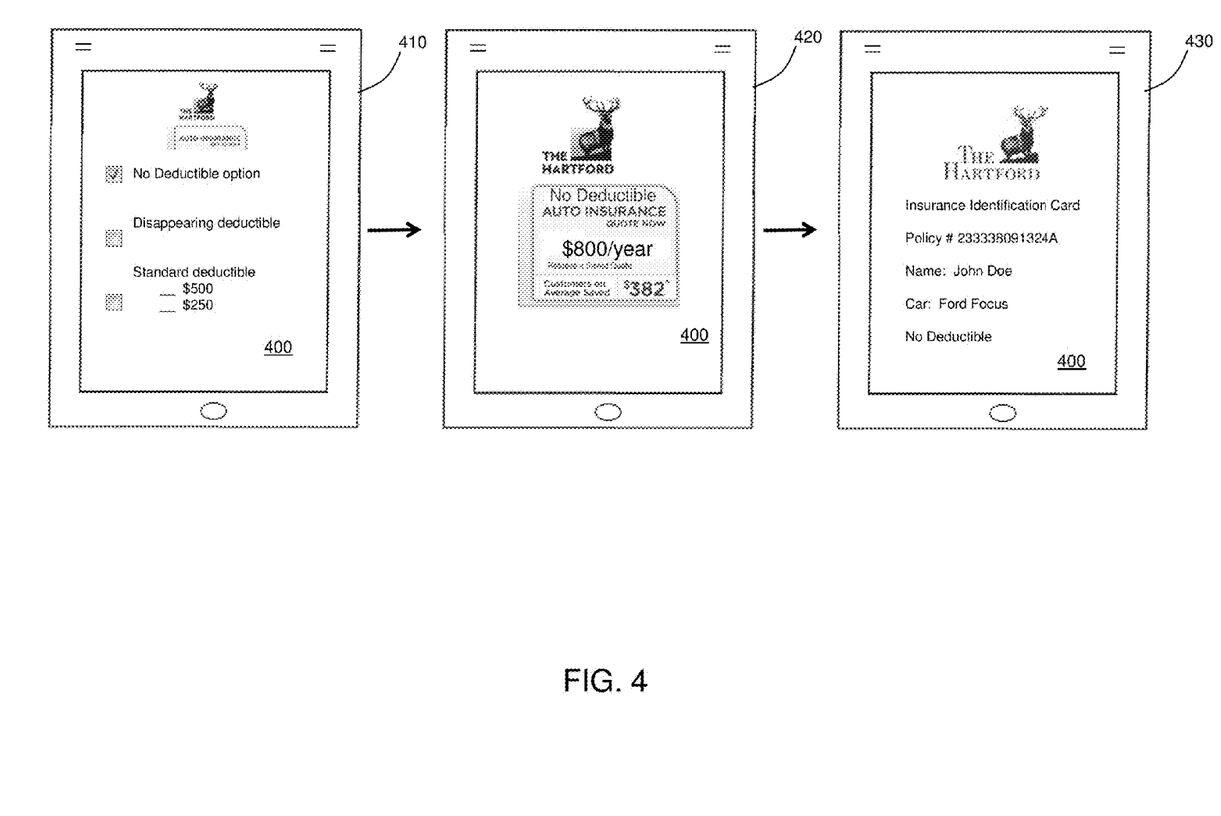
FIG. 4 shows an exemplary system device in operation.

Turning now to FIG. 4, an exemplary user device 400 is illustrated displaying a quotation process in accordance with the present invention. Device 400 displays a quotation web page or document 410 that may be generated by the primary insurance data system 110 shown relative to FIG. 1. Document 410 is configured to receive certain information and input on behalf of the user through a series of inputs provided on user device 400. Such information and input provided by the user is then stored such as in a data storage device described with respect to FIGS. 1 and 2. Web document 410 is configured to receive input from the user regarding their insurance profile such as in the case of automobile insurance, the number of cars they are seeking to insure, how they are going to use the cars, and the desired deductible option such as a no deductible option. In operation, the user moves from one user input field to another form field to complete each selected data request or question displayed in each form field.

In embodiments of the present invention, device 400 may be a touch sensitive display that is responsive to a finger, a stylus, etc. for manipulation and completion of form 410. Certain operating circuitry may control or operate device 400 to show different respective images, such as, for example, inputs, text instructions or information, icons or functions of a graphical user interface (GUI), lists of information, etc., as is known. Device 400 further is operative to display an insurance quotation with no deductible such as shown in screen display 420. Upon acceptance of the quotation shown in screen display 420, the user may be provided an electronic insurance identification card shown in screen display 430.

Figure 5:
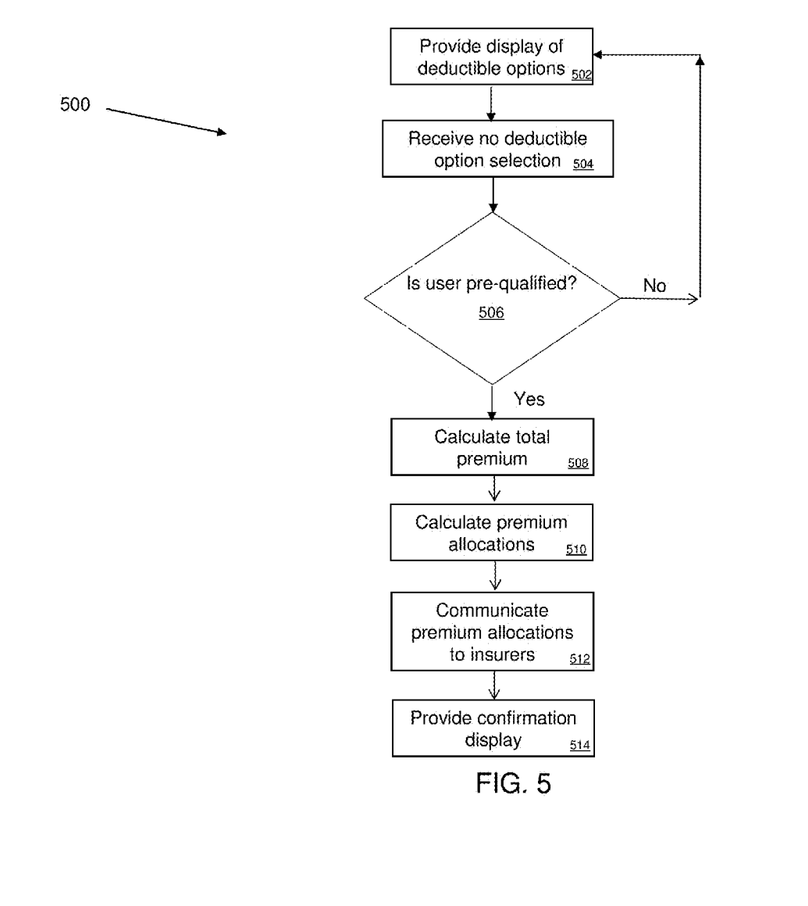
FIG. 5 shows an exemplary method of the present invention.

FIG. 5 shows an example process flow diagram illustrating a method 500 for administering an electronic insurance deductible management process using the example architecture 100 of FIG. 1. The method 500 of FIG. 5 may begin by providing a display of deductible options such as shown in FIG. 3, step 502. Method 500 continues with receiving a deductible option selection, such as an insured deductible option selection such as a no deductible option, step 504. It is determined then if the user/consumer is qualified for the no-deductible option, step 506. For example, qualification may be based on historical driving history and/or use of telematics based data. Responsive to determining that the user/consumer is qualified for the no-deductible option, method 500 continues with calculating a total premium for the policy including the no deductible option, step 508. In one embodiment, the primary insurer computes a premium for an insurance policy including a deductible, computes a premium for coverage for the amount of the deductible on claims under the insurance policy, and then sums the two computed premiums to determine the total premium for policy including the no deductible option. Method 500 further continues with calculating premium allocations for the no deductible option, step 510. In one embodiment, the total premium is paid by the user/policyholder to the primary insurer and then allocated by the primary insurer to the secondary insurer. In this embodiment, the method may include providing a display, such as on a graphical user interface of a client device, a screen including instructions for the consumer to direct a payment in the amount of the total premium to the primary insurer. Such screen may include prompts to input electronic payment data and authorizations, such as credit card or debit card numbers and security data, checking account data for generation of electronic payment instructions, or mailing address data for mailing of a paper check or other payment instrument. In another embodiment, the user/policyholder may pay a separate payment to each of the primary and the secondary insurers. In this embodiment, the method may include providing a first and second displays on a graphical user interface of a client device, the first display including instructions for the consumer to direct a payment in the amount of the portion of the total premium amount due to the primary insurer, and the second display including instructions for the consumer to direct a payment in the amount of the portion of the total premium amount due to the secondary insurer. Such screens may be displayed successively or simultaneously, and each may include prompts to input electronic payment data and authorizations, such as credit card or debit card numbers and security data, checking account data for generation of electronic payment instructions, or mailing address data for mailing of paper checks or other payment instruments. Method 500 proceeds with transmitting such as via the communications interface, the premium allocations to the primary and secondary insurer, step 512. Method 500 proceeds with outputting an electronic insurance confirmation to the user, step 514. The method 500 may accordingly provide for the secondary insurer to provide coverage for the no deductible option or a reduced deductible option with no involvement by the consumer; the lack of involvement by the consumer may mean, by way of example, that the consumer does not select the secondary insurer, and does not submit an application for insurance or other data directly to the secondary insurer.

Figure 6:
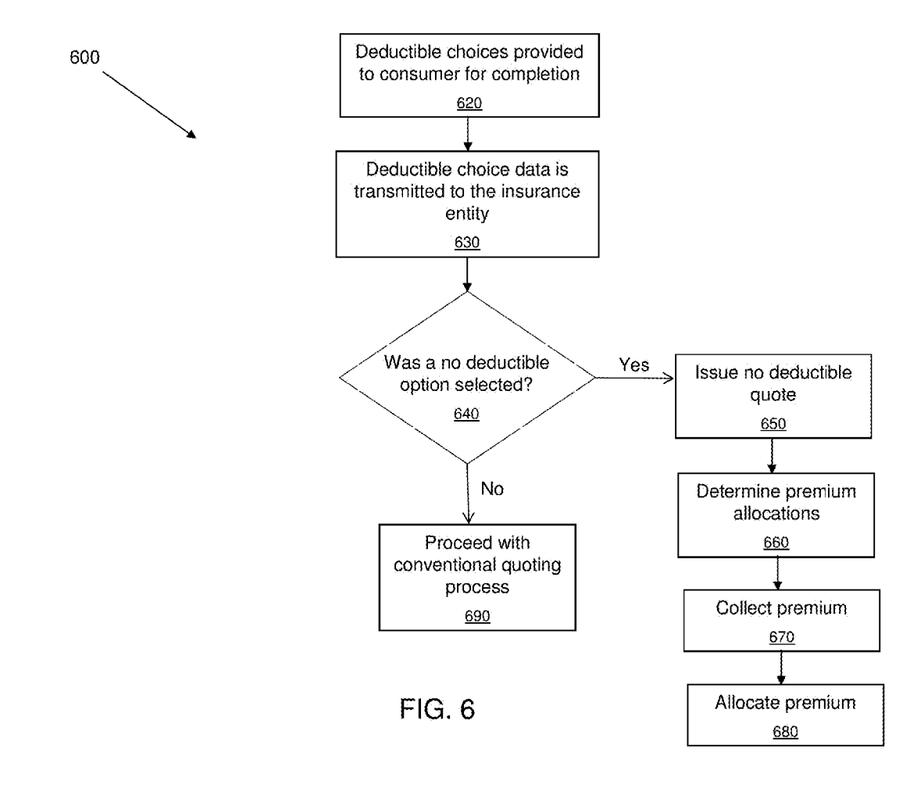
FIG. 6 shows another exemplary method of the present invention.

FIG. 6 shows a process flow diagram illustrating another computer implemented method 600 of the present invention. In an embodiment, deductible choices are provided to consumer for completion, step 620. Next, the deductible choice data is transmitted to the insurance entity, step 630. It is determined then if a no deductible option was selected, step 640. If a no deductible option was selected, then a no deductible quote is issued, step 650. The premium allocation, such as between a primary and secondary insurer, is then determined, step 660. Premiums are then collected, step 670. In one exemplary embodiment, the consumer makes a premium payment to both the primary and secondary insurer and in another embodiment, the consumer makes a premium payment to only one of the primary and secondary insurer. Premiums are then allocated, step 680. The method may cause the one of the primary and secondary insurers that received the premium payment to share an allocated portion of the premium payment with the other one of the primary and secondary insurers. If a no deductible option was not selected, then the conventional quoting process proceeds, step 690.

One or more steps of method 600 may be implemented as computer program instructions provided on a non-transitory computer readable medium for execution by one or more processors. As used to herein, the term "computer-readable medium" broadly refers to and is not limited to a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or Blu-ray Disc, or other type of device for electronic data storage.

Figure 7:
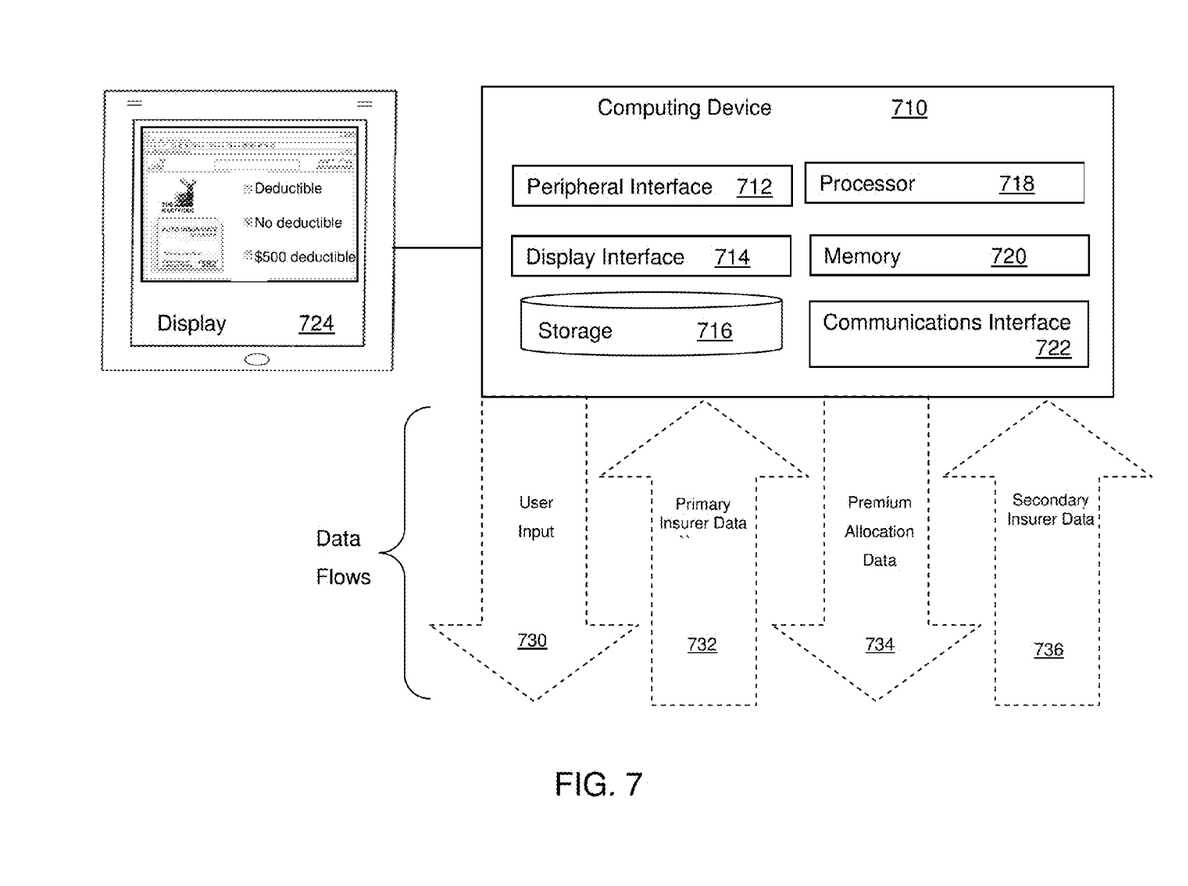
FIG. 7 shows another exemplary device of the present invention.

FIG. 7 shows an example computing device 710 that may be used to implement features describe above. The computing device 710 may include a peripheral device interface 712, display device interface 714, a storage device 716, a processor 718, a memory device 720, and a communications interface 722. Computing device may be coupled to a display device 724, which may be separately coupled to or included within the computing device 710. In operation, computing device 710 is configured to receive and transmit a number of data flows via communications interface 722 including, for example, user data 730, primary insurer data 732, premium allocation data 734 and secondary insurer data 736.

The peripheral device interface 712 may be an interface configured to communicate with one or more peripheral devices. The peripheral device interface 712 may operate using a technology such as Universal Serial Bus (USB), PS/2, Bluetooth, infrared, serial port, parallel port, and/or other appropriate technology. The peripheral device interface 712 may, for example, receive input data from an input device such as a keyboard, a mouse, a trackball, a touch screen, a touch pad, a stylus pad, and/or other device. Alternatively or additionally, the peripheral device interface 712 may communicate output data to a printer that is attached to the computing device 710 via the peripheral device interface 712.

The display device interface 714 may be an interface configured to communicate data to display device 724. The display device 724 may be, for example, a monitor or television display, a plasma display, a liquid crystal display (LCD), and/or a display based on a technology such as front or rear projection, light emitting diodes (LEDs), organic light-emitting diodes (OLEDs), or Digital Light Processing (DLP). The display device interface 714 may operate using technology such as Video Graphics Array (VGA), Super VGA (S-VGA), Digital Visual Interface (DVI), High-Definition Multimedia Interface (HDMI), or other appropriate technology. The display device interface 714 may communicate display data from the processor 718 to the display device 724 for display by the display device 724. As shown in FIG. 7, the display device 724 may be external to the computing device 710, and coupled to the computing device 710 via the display device interface 714. Alternatively, the display device 724 may be included in the computing device 700.

The memory device 720 of FIG. 7 may be or include a device such as a Dynamic Random Access Memory (D-RAM), Static RAM (S-RAM), or other RAM or a flash memory. The storage device 716 may be or include a hard disk, a magneto-optical medium, an optical medium such as a CD-ROM, a digital versatile disk (DVDs), or Blu-Ray disc (BD), or other type of device for electronic data storage.

The communication interface 722 may be, for example, a communications port, a wired transceiver, a wireless transceiver, and/or a network card. The communication interface 722 may be capable of communicating using technologies such as Ethernet, fiber optics, microwave, xDSL (Digital Subscriber Line), Wireless Local Area Network (WLAN) technology, wireless cellular technology, and/or any other appropriate technology.

An instance of the computing device 710 of FIG. 7 may be configured to perform any feature or any combination of features described above as performed by the consumer client device 130 as described with respect to FIG. 1. In such an instance, the memory device 720 and/or the storage device 716 may store instructions which, when executed by the processor 718, cause the processor 718 to perform any feature or any combination of features described above as performed by the web browser module 134. Alternatively or additionally, in such an instance, each or any of the features described above as performed by the web browser module 134 may be performed by the processor 718 in conjunction with peripheral device interface 712, display device interface 714, and/or storage device 716, memory device 720, and communication interface 722.

Alternatively or additionally, an instance of the computing device 710 may be configured to perform any feature or any combination of features described above as performed by the primary insurance data system 110. In such an instance, the memory device 720 and/or the storage device 716 may store instructions which, when executed by the processor 718, cause the processor 718 to perform any feature or any combination of features described above as performed by the interface module 112 and/or the insurance quote/deductible calculation module 114. In such an instance, the processor 718 may perform the feature or combination of features in conjunction with the memory device 720, communication interface 722, peripheral device interface 712, display device interface 714, and/or storage device 716.

Alternatively or additionally, an instance of the computing device 710 may be configured to perform any feature or any combination of features described above as performed by the product management system 160. In such an instance, the memory device 720 and/or the storage device 716 may store instructions which, when executed by the processor 718, cause the processor 718 to perform any feature or any combination of features described above as performed by product management system 160. In such an instance, the processor 718 may perform the feature or combination of features in conjunction with the memory device 720, communication interface 722, peripheral device interface 712, display device interface 714, and/or storage device 716.

Alternatively or additionally, an instance of the computing device 710 may be configured to perform any feature or any combination of features described above as performed by the web site system 120. In such an instance, the memory device 720 and/or the storage device 716 may store instructions which, when executed by the processor 718, cause the processor 718 to perform any feature or any combination of features described above as performed by the insurance web application module 122 and/or the HTTP server module 124. In such an instance, the processor 718 may perform the feature or combination of features in conjunction with the memory device 720, communication interface 722, peripheral device interface 712, display device interface 714, and/or storage device 716.

Although FIG. 7 shows that the computing device 710 includes a single processor 718, single memory device 720, single communication interface 722, single peripheral device interface 712, single display device interface 714, and single storage device 716, the computing device may include multiples of each or any combination of these components 712, 714, 716, 718, 720, and 722 and may be configured to perform analogous functionality to that described above.

Figure 8:
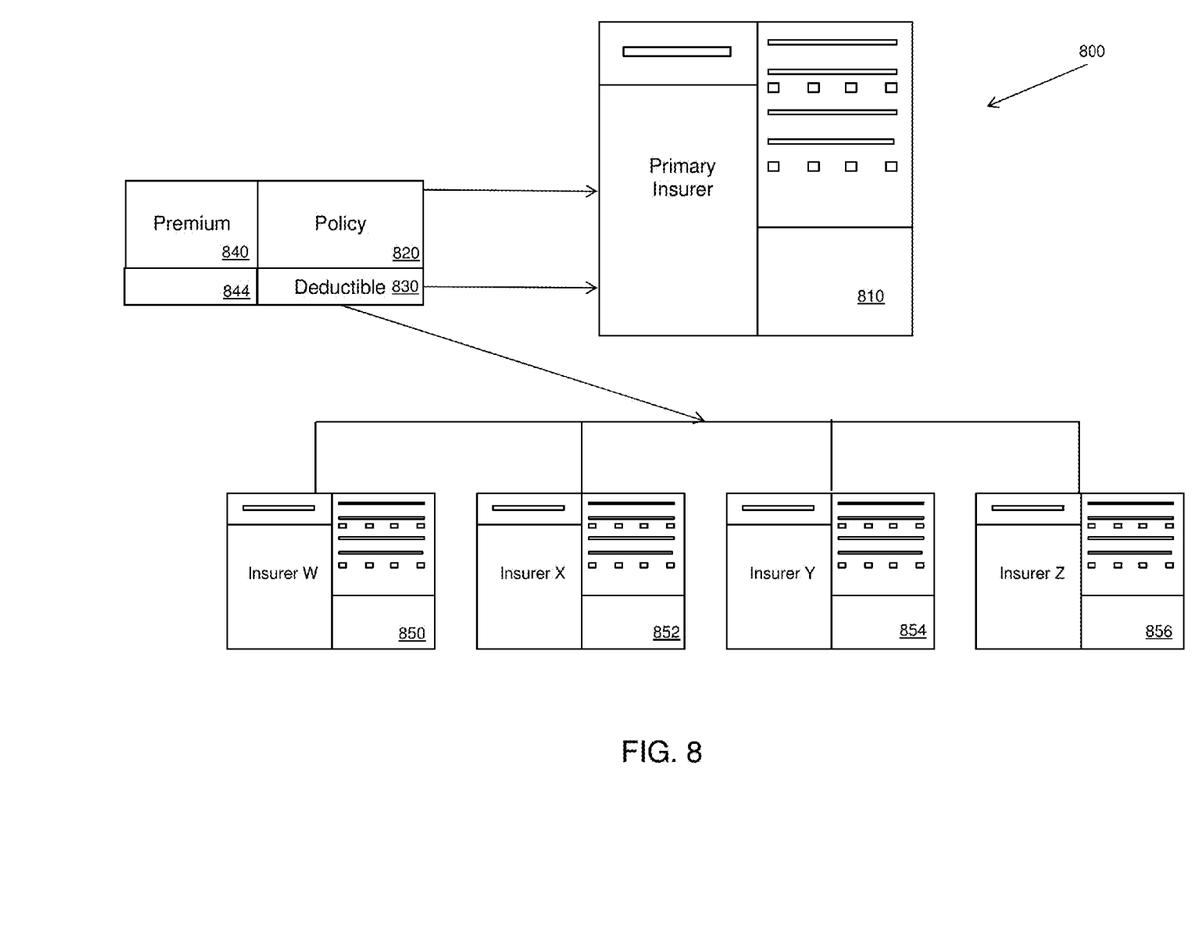
FIG. 8 shows another exemplary system platform of the present invention.

Referring now to FIG. 8, a multi-insurer platform 800 is shown for administrating and managing shadow deductibles of the present invention. Multi-insurer platform 800 includes a primary insurer 810 through which primary insurance policies such as home, automobile and commercial real estate policies may be issued. An exemplary policy 820 may be underwritten by primary insurer 810. Policy 820 will have a shadow or hidden deductible 830 associated with policy 820 so that the policy may be underwritten in a manner such that the policyholder never has to pay a deductible, and/or never has a payment amount reduced by a deductible, in the event of a covered loss or claim. Policy 820 also has an associated premium 840 of which a portion 844 is allocated to cover the deductible. The deductible is then separately insured or backed by a third party or secondary insurer such as insurer W 850, insurer X 852, insurer Y 854 and insurer Z 856. In an exemplary embodiment, primary insurer 810 receives premium 840 and then allocates portion 844 to the designated third party insurer W 850, insurer X 852, insurer Y 854 or insurer Z 856. In other embodiments, a number of deductibles may be pooled and then allocated to designated third party insurer W 850, insurer X 852, insurer Y 854 or insurer Z 856 so that the third party insurer would be responsible for covering the deductible for a number of policyholders. Third party insurer W 850, insurer X 852, insurer Y 854 and insurer Z 856 may also be used to participate in a competitive bidding process for the deductible options. Thus, a plurality of methods are available by which one or more insurers may be selected via a computer processor to provide coverage associated with an insurance policy.

Shadow deductible 830 may have one or more variations. By way of example, the amount of the insured deductible coverage may be a fixed value less than the deductible under the policy 820. In other embodiments, the amount of the insured deductible coverage may be determined on a claim by claim basis and tiered based on a value of a claim. The tiers may be two or more tiers representing percentages of the policy deductible, not more than 100% of the policy deductible, or dollar values not more than 100% of the policy deductible. For example, the insured deductible coverage may have 4 tiers of 25%, 50%, 75% and 100%, each of the percentages being percentages of the deductive, corresponding respectively to claim value ranges of $0.01 to $500.00, $500.01 to $1000.00, $1000.01 to $2000.00, and $2000.01 and above. The number of tiers, the percentages, and the corresponding ranges of claim values may vary. Rather than on the basis of tiers, the amount of the insured deductible coverage may be a proportional share of the deductible equal to a proportion that the value of the claim is to a set value, such as $2000.00 or another value. The proportion may adjusted in any manner, such as on a scale from a non-zero percentage, e.g., 50%, and up to a percentage less than 100%. In an embodiment, the amount of the insured deductible coverage may be determined not on a claim by claim basis, but on a basis of all claims during a current policy term, or all claims during a time period, which time period may be a period less than a policy term, such as a month or a calendar quarter, the last day of which is the date of loss (such as date of collision, theft or fire) of the latest claim. The time period may be a time period greater than the policy term. By way of example, the tiers or percentages may be based on a total value of all claims since the policyholder became a customer of the primary insurer, or for a maximum period of time, such as five years, during which the policyholder was a customer of the primary insurer.

Figure 9:
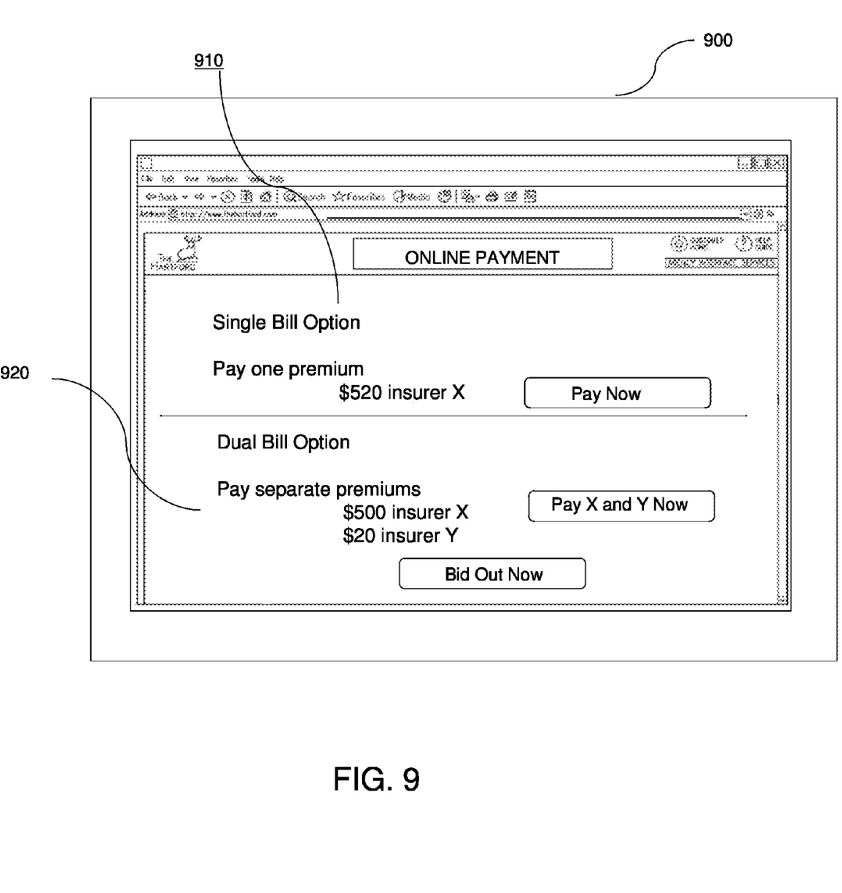
FIG. 9 shows another exemplary screen of the present invention.

Referring now to FIG. 9, an exemplary premium payment screen 900 of the present invention is shown. Screen 900 includes a single payment option 910 and a dual payment option 920 and allows the user to select between paying a single insurer bill or a dual bill when utilizing the no deductible option of an embodiment of the present invention. In one embodiment, the single payment option allows the user to pay the primary insurer and the primary insurer then allocates the premium to the insurer who is covering the deductible option. In other embodiments, the primary insurer may put the deductible portion out to bid for the other insurers or put the deductible into a pool of insured deductibles. Under the dual payment option 920, the policyholder makes separate payments for the primary policy and for the deductible portion. The user may also initiate a bidding process where they may ask for competitive bids for the deductible portion or even the primary portion of their policy.

In embodiments, the primary insurer and secondary insurer are anonymous to one another. By way of example, the multi-insurer platform of FIG. 8 may be configured to include a plurality of primary insurers, and at least one intermediary computer system, in addition to the depicted plurality of secondary insurers. The system may be configured so that a primary insurer furnishes to the intermediary computer system a request for a secondary insurer to cover a no deductible option of a policy issued or to be issued by the primary insurer. The intermediary computer system may then communicate the request to one or more of the secondary insurers, but without identification of the primary insurer. One or more secondary insurers provides a response to the request, such as a bid, and the no deductible option is allocated to a successful bidder of the one or more secondary insurers.

In an embodiment in which the consumer makes a payment only to one of the primary and secondary insurers, the one of the primary and secondary insurers that received the payment may share a portion by making a payment to the other of the primary and secondary insurers. The payment may be combined with or offset by other payments in any suitable manner, such as via a single payment for each premium payment, periodic payments for all premium payments during a given time period, such as daily, weekly, monthly or other basis, or on a periodic net basis, such as net of premium payments to a secondary insurer and claim payments from the secondary insurer on a periodic basis.

Although the methods and features described above with reference to FIGS. 1-9 are described above as performed using the example architecture 100 of FIG. 1 and the example system 200 of FIG. 2, the methods and features described above may be performed using any appropriate architecture and/or computing environment. Although features and elements are described above in particular combinations, each feature or element can be used alone or in any combination with or without the other features and elements. For example, each feature or element as described with reference to FIGS. 1-9 may be used alone without the other features and elements or in various combinations with or without other features and elements. Sub-elements of the methods and features described above with reference to FIGS. 1-9 may be performed in any arbitrary order (including concurrently), in any combination or sub-combination.

What is claimed is:

1. A system for administering insurance policies for issue to a consumer by a primary insurer without requiring deductible payments by the consumer, the system comprising:
    at least one processor;
    a memory coupled to the at least one processor;
    and one or more programs, wherein the one or more programs are stored in the memory and configured to be executed by the at least one processor, the one or more programs including instructions for:
    providing a deductible option selection screen on a graphical user interface;
    receiving a deductible option selection from the graphical user interface;
    storing the deductible option selection in a storage device; and
    responsive to receiving an insured deductible option selection from the graphical user interface, communicating, via a communications network, the deductible option selection to the primary insurer and a secondary insurer distinct from the primary insurer, the primary insurer issuing to the consumer an insurance policy having a deductible, and the secondary insurer providing deductible insurance coverage for the policy without involving the consumer.

2. The system of claim 1, wherein the one or more programs further include instructions to provide deductible options including an insured deductible, a disappearing deductible and a standard deductible.

3. The system of claim 2, wherein the one or more programs further include instructions to display instructions for payment of a premium related to the insured deductible directly by the consumer to the primary insurer.

4. The system of claim 3, wherein the one or more programs further include instructions to calculate a portion of the premium for paying to the secondary insurer.

5. The system of claim 1, wherein the one or more programs further include instructions to determine whether the consumer is qualified for the insured deductible option selection.

6. The system of claim 1, wherein the one or more programs further include instructions to display instructions for the consumer to make a premium payment to both the primary and secondary insurer.

7. The system of claim 1, wherein the one or more programs further include instructions to display instructions for the consumer to make a premium payment to only one of the primary and secondary insurer.

8. The system of claim 7, wherein the one or more programs further include instructions for the premium payment to be shared by the primary insurer and the secondary insurer on a proportional basis.

9. The system of claim 1, wherein the one or more programs further include instructions to render the graphical user interface on a mobile device app.

10. The system of claim 1, wherein the insured deductible selection is tiered based on a value of a claim.

11. The system of claim 1, the one or more programs further include instructions for rendering a deductible bidding screen for the consumer.

12. The system of claim 1, wherein the primary insurer and secondary insurer are anonymous to one another.

13. A computer system for providing insured deductible options to a current or future policyholder of an insurance policy for issue by a primary insurer, comprising:
    a processor; and
    a memory storage device in communication with the processor;
    the processor configured to:
    receive via a computer communications network applicant data related to a no deductible option selection;
    store the no deductible option selection in the memory storage device
    determine, based on the no deductible option selection, a total premium associated with the no deductible option selection; and
    transmit information related to the no deductible option selection to at least the primary insurer and a secondary insurer distinct from the primary insurer, wherein the at least the primary and the secondary insurers share the determined premium, the primary insurer issuing to the policyholder the insurance policy having a deductible, and the secondary insurer providing deductible insurance coverage for the policy.

14. The system of claim 13, wherein the no deductible option requires pre-qualification based on at least past historical performance of a policyholder.

15. The system of claim 14, wherein the no deductible option does not require a policyholder to pay a deductible amount in the event of a claim.

16. The system of claim 15, wherein the no deductible option requires pre-qualification based further on telematics data.

17. The system of claim 13, wherein the processor is further configured to render a graphical user interface for bidding out the no deductible option.

18. A computer-implemented method for administering insurance policies in a multi-insurer platform, the policies each having a separable deductible, comprising:
    receiving, via a communications interface, data for an insurance policy having a separable deductible to at least one party;
    determining, via a computer processor, insurance premium information for the at least one party;
    selecting, via the computer processor, two or more insurers for sharing of the insurance policy;
    storing, via a data storage device information related to the two or more insurers; and
    transmitting data to the two or more selected insurers, the selected insurers being distinct entities, wherein one of the selected insurers is to issue to the at least one party the insurance policy and another one of the selected insurers is allocated a deductible coverage for the separable deductible associated with the insurance policy.

19. The computer-implemented method of claim 18, wherein the deductible coverage is allocated a portion of a premium paid by the at least one party.

* * * * *